United States Patent
Trpkovski

(10) Patent No.: US 7,076,927 B2
(45) Date of Patent: Jul. 18, 2006

(54) APPARATUS FOR MANUFACTURING MUNTIN BAR ASSEMBLIES

(75) Inventor: Paul Trpkovski, Loganville, WI (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 10/818,097

(22) Filed: Apr. 5, 2004

(65) Prior Publication Data

US 2004/0187407 A1 Sep. 30, 2004

Related U.S. Application Data

(63) Continuation of application No. 10/051,988, filed on Jan. 16, 2002, now Pat. No. 6,739,101.

(60) Provisional application No. 60/262,807, filed on Jan. 19, 2001.

(51) Int. Cl.
*E06B 3/00* (2006.01)
*E06B 3/24* (2006.01)

(52) U.S. Cl. .......................... 52/204.5; 52/172; 428/34

(58) Field of Classification Search ................ 52/172, 52/397, 398, 786.13, 204.5; 428/34
See application file for complete search history.

(56) References Cited

U.S. PATENT DOCUMENTS

| | | | |
|---|---|---|---|
| 2,353,579 A | 7/1944 | Miller | |
| 3,004,636 A | 10/1961 | Shane | |
| 3,380,145 A * | 4/1968 | Stroud et al. | 29/411 |
| 3,640,787 A | 2/1972 | Heller | |
| 3,888,441 A * | 6/1975 | Rebentisch | 248/73 |
| 3,960,460 A | 6/1976 | Fischer | |
| 4,057,945 A * | 11/1977 | Kessler | 52/204.593 |
| 4,080,482 A * | 3/1978 | Lacombe | 428/34 |
| 4,322,926 A * | 4/1982 | Wolflingseder et al. | 52/172 |
| 4,357,744 A | 11/1982 | McKenzie et al. | |
| 4,468,905 A * | 9/1984 | Cribben | 52/172 |
| 4,479,988 A | 10/1984 | Dawson | |
| 4,495,023 A | 1/1985 | Lisec | |
| 4,514,899 A | 5/1985 | Burger | |
| 4,574,553 A | 3/1986 | Lisec | |
| 4,594,764 A | 6/1986 | Yamamoto | |
| 4,743,336 A | 5/1988 | White | |
| 4,769,105 A | 9/1988 | Lisec | |
| 4,836,005 A | 6/1989 | Lisec | |
| 4,850,175 A | 7/1989 | Berdan | |
| 4,885,926 A | 12/1989 | Lisec | |
| 4,886,410 A | 12/1989 | Lisec | |
| 4,902,213 A | 2/1990 | Lisec | |
| 4,949,666 A | 8/1990 | Lisec | |

(Continued)

FOREIGN PATENT DOCUMENTS

CA 363117 10/1923

(Continued)

*Primary Examiner*—Anita M. King
(74) *Attorney, Agent, or Firm*—Fredrikson & Byron, PA

(57) ABSTRACT

Methods and apparatus for assembling muntin bar lattices and spacer frames for use in insulating glass units are disclosed. One method of assembling a muntin bar lattice in accordance with the present invention comprises the steps of providing a muntin bar segment and a keeper dimensioned for piercing a wall of the muntin bar segment. A keeper in accordance with an exemplary embodiment of the present invention comprises an elongate body including a tip portion that is dimensioned for piercing a wall of the muntin bar segment to create an opening therein. A spacer for the separation of panes in an insulating glass unit in accordance with one exemplary embodiment of the present invention may include a tubular member comprising a wall defining a lumen and a mounting flange defining a plurality of mounting holes.

13 Claims, 22 Drawing Sheets

U.S. PATENT DOCUMENTS

| | | | |
|---|---|---|---|
| 4,960,253 A * | 10/1990 | Perrault et al. | 248/68.1 |
| 4,961,816 A | 10/1990 | Lisec | |
| 4,970,840 A | 11/1990 | Ouellette et al. | |
| 5,002,309 A | 3/1991 | Vecellio | |
| 5,094,055 A * | 3/1992 | Berdan | 52/204.591 |
| 5,099,626 A | 3/1992 | Seeger | |
| 5,117,669 A | 6/1992 | Lisec | |
| 5,161,401 A | 11/1992 | Lisec | |
| 5,177,920 A | 1/1993 | Rafeld | |
| 5,181,412 A | 1/1993 | Lisec | |
| 5,243,844 A | 9/1993 | Lisec | |
| 5,313,761 A | 5/1994 | Leopold | |
| 5,315,797 A | 5/1994 | Glover et al. | |
| 5,351,459 A | 10/1994 | Kassl et al. | |
| 5,361,476 A | 11/1994 | Leopold | |
| 5,377,473 A | 1/1995 | Narayan et al. | |
| 5,439,716 A | 8/1995 | Larsen | |
| 5,456,048 A | 10/1995 | White | |
| 5,514,432 A | 5/1996 | Lisec | |
| 5,533,314 A | 7/1996 | Kunert | |
| 5,568,714 A * | 10/1996 | Peterson | 52/786.13 |
| 5,574,651 A | 11/1996 | McKeegan et al. | |
| 5,657,590 A | 8/1997 | Digman et al. | |
| 5,678,377 A | 10/1997 | Leopold | |
| 5,679,419 A | 10/1997 | Larsen | |
| 5,705,010 A | 1/1998 | Larsen | |
| 5,714,214 A | 2/1998 | Larsen | |
| 5,791,102 A | 8/1998 | Sheath et al. | |
| 5,794,481 A | 8/1998 | Lisec | |
| 5,802,789 A * | 9/1998 | Goodman et al. | 52/239 |
| 5,860,346 A | 1/1999 | McKeegan, Jr. et al. | |
| 5,862,584 A | 1/1999 | Manser | |
| 5,890,289 A * | 4/1999 | Guillemet | 29/897.312 |
| 5,927,041 A | 7/1999 | Sedlmeier et al. | |
| 5,980,667 A | 11/1999 | Reeder et al. | |
| 6,021,701 A | 2/2000 | McKeegan, Jr. et al. | |
| 6,035,597 A | 3/2000 | Donaldson | |
| 6,102,206 A | 8/2000 | Pride | |
| 6,128,871 A | 10/2000 | Corey | |
| 6,131,356 A | 10/2000 | Gieseke | |
| 6,173,484 B1 | 1/2001 | McGlinchy et al. | |
| 6,192,651 B1 | 2/2001 | Donaldson | |
| 6,197,231 B1 | 3/2001 | Lisec | |
| 6,240,685 B1 | 6/2001 | Eichhorn | |
| 6,244,012 B1 | 6/2001 | McGlinchy et al. | |
| 6,299,129 B1 * | 10/2001 | Suzuki et al. | 251/129.11 |
| 6,301,843 B1 | 10/2001 | Silverman | |
| 6,425,221 B1 | 7/2002 | Reichert | |

FOREIGN PATENT DOCUMENTS

| | | |
|---|---|---|
| DE | 83 07 458.9 | 7/1983 |
| DE | 3404077 A1 * | 10/1985 |
| DE | 4130813 A1 * | 3/1993 |
| DE | 200 08 654 U 1 | 9/2000 |
| EP | 0 545 024 A1 | 6/1992 |
| EP | 651124 | 5/1995 |
| FR | 2 574 467 | 7/1984 |

* cited by examiner

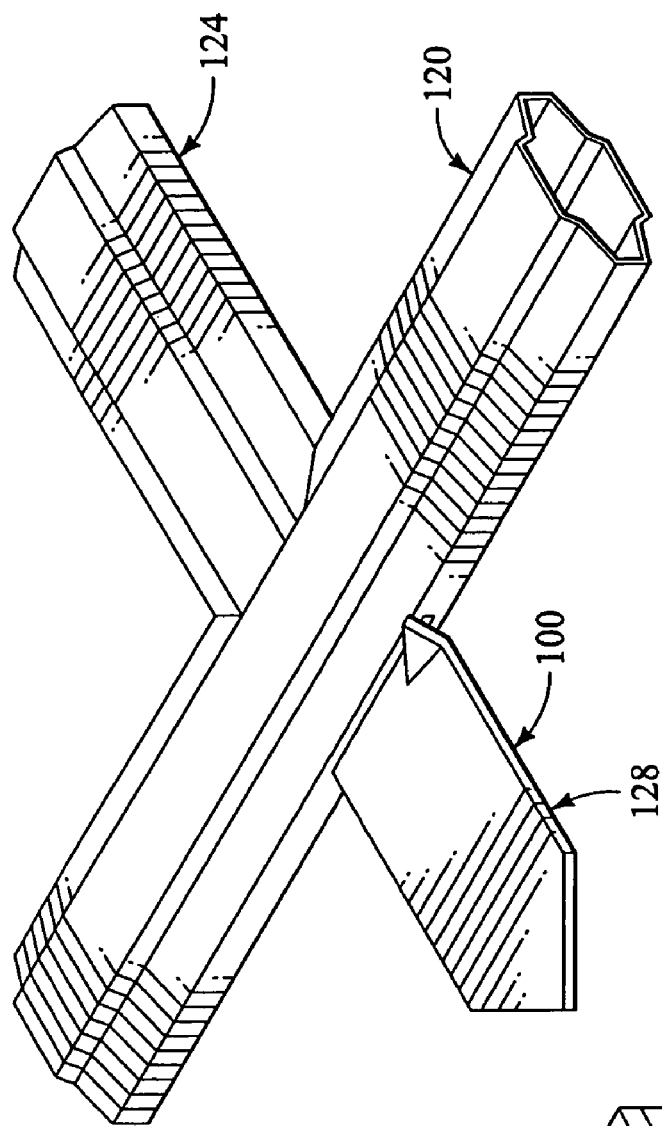
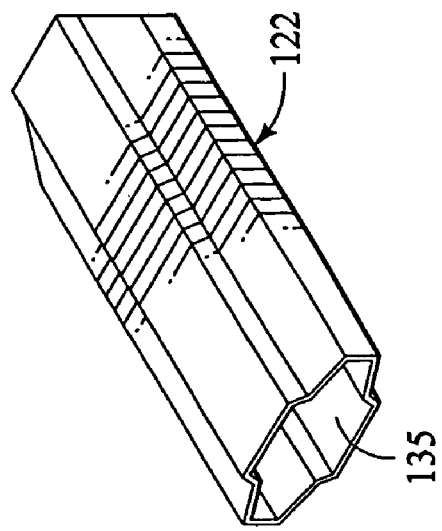
FIG. 6

APPARATUS FOR MANUFACTURING MUNTIN BAR ASSEMBLIES

RELATED APPLICATIONS

This is a Continuation of application Ser. No. 10/051,988 filed Jan. 16, 2002 now U.S. Pat. No. 6,739,101.

This application claims priority to U.S. patent application Ser. No. 60/262,807 by Trpkovski filed on Jan. 19, 2001 the entire disclosure of which is hereby incorporated by reference.

FIELD OF THE INVENTION

The present invention relates generally to methods and apparatus for manufacturing insulating glass units. More particularly, the present invention relates to methods and apparatus for assembling muntin bar lattices and spacer frames for use in insulating glass units.

BACKGROUND OF THE INVENTION

Today, insulating glass units have achieved widespread use as building components. In order to produce insulating glass units inexpensively and in high volume, the use of mechanized and/or automated assembly methods is desirable. An insulating glass unit may include, for example, a pair of panes and a spacing frame interposed between the panes. The panes and the spacing frame together define the sealed space. In some applications, a gas is disposed in the sealed space of the insulating glass unit.

In many applications, the panes of the insulating glass unit are transparent. When this is the case, the insulating glass unit may form a portion of a window. Windows allow the occupants of buildings to view the world outside while allowing sunlight to enter the interior of the building. Sunlight is a natural antidepressant and helps the human body produce vitamin D thus, a certain amount of sunlight is essential to mental and physical well being.

When the panes of the glass unit are transparent, it is desirable to keep the inside surfaces of the panes free from visible defects and contamination. One example of a visual defect occurs when particles are present in the sealed space and settle on the inside surfaces of the panes. A second example of a visual defect occurs when materials disposed within the sealed space out gas resulting in visible discolorations on or in the panes. A third example of a visual defect occurs when the gas in the sealed space contains moisture which condenses on the inside surfaces of the panes.

SUMMARY OF THE INVENTION

The present invention relates generally to methods and apparatus for manufacturing insulating glass units. More particularly, the present invention relates to methods and apparatus for assembling muntin bar lattices and spacer frames for use in insulating glass units. One method of assembling a muntin bar lattice in accordance with the present invention comprises the steps of providing a muntin bar segment and a keeper dimensioned for piercing a wall of the muntin bar segment. This method may also advantageously include the step of piercing the wall of the muntin bar with the keeper.

Additionally, the keeper may be placed in a desired position in which a first portion of the keeper extends beyond a first side of the muntin bar segment and a second portion of the keeper extends beyond a second side of the muntin bar segment. Certain implementations of the present invention may include the step of locking the keeper in the desired position. In these implementations, a keeper including a lock may be provided. A method in accordance with the present invention may also include the step of inserting the second portion of the keeper into a cavity of a second muntin bar segment. Additionally, the first portion of the keeper may be inserted into a cavity of a third muntin bar segment.

A keeper for joining a muntin bar segment to a second muntin bar segment in accordance with an exemplary embodiment of the present invention comprises an elongate body having a proximal end and a distal end. The body may advantageously include a tip portion disposed at the proximal end thereof. In certain implementations, the tip portion is dimensioned for piercing a wall of the muntin bar segment to create an opening therein.

In certain useful implementations of the present invention, the body has an overall thickness that is less than an overall thickness of the muntin bar. In certain advantageous implantations, the body has an overall thickness that is less than about half the overall thickness of the muntin bar. In one aspect of the present invention, the tip portion of the body includes a first cutting edge. In another aspect of the present invention, the first cutting edge has a length that is substantially equal to a thickness of the body.

The tip portion of the body may also include a second cutting edge disposed at a first angle relative to a longitudinal axis of the body. In another aspect of the present invention, the tip portion of the body may include a third cutting edge disposed at a second angle relative to the longitudinal axis of the body. In some implementations, the second angle is substantially equal to the first angle.

In certain advantageous implementations, the body of the keeper is substantially symmetrical about a longitudinal axis thereof. The body of the keeper may also be substantially symmetrical about a lateral axis thereof. In another aspect of the present invention, the body of the keeper has an overall width dimensioned to be received in a cavity of the second muntin bar segment.

In certain implementations, the muntin bar segment comprises a material having a first modulus of elasticity and the keeper comprises a material having a second modulus of elasticity greater than the first modulus of elasticity. Also certain implementations, the muntin bar segment comprises a material having a first yield strength and the keeper comprises a material having a second yield strength greater than the first yield strength. Also in certain implementations, the muntin bar segment comprises a material having a first hardness and the keeper comprises a material having a second hardness greater than the first hardness. In certain implementations, the muntin bar segment comprises aluminum and the keeper comprises stainless steel.

A keeper in accordance with the present invention may advantageously include a lock for holding the keeper in a desired position relative to a muntin bar segment. In certain implementations, the lock includes a ramping surface that is dimension to elastically deform the wall of the muntin bar segment. The lock may also advantageously include a locking surface that is dimension to cooperate with the wall of the muntin bar segment to prevent retrograde motion of the keeper.

A spacer for the separation of panes in an insulating glass unit in accordance with one exemplary embodiment of the present invention may include a tubular member comprising a wall defining a lumen and a mounting flange comprising a first portion of the wall that is doubled back upon itself. The mounting flange may advantageously include a plurality of mounting holes. In one aspect of the present invention, the mounting holes are dimensioned to receive a plurality of prongs of a clip. The spacer may advantageously include a seam formed between a first leg of the mounting flange and a second leg of the mounting flange. In some implementations, the spacer also includes a second mounting flange comprising a second portion of the wall that is doubled back upon itself.

A spacer in accordance with the present invention may further include a plurality of granules disposed within a lumen of the spacer. The granules may advantageously comprise, for example, a desiccant (e.g., molecular sieve) and/or a filler material (e.g., clay).

A spacer for the separation of panes in an insulating glass unit in accordance with another exemplary embodiment of the present invention may comprise a tubular member defining a first lumen and a second lumen. A seal may be advantageously interposed between the first lumen and the second lumen. The spacer may advantageously include a plurality of mounting holes communicating with the second lumen and separated from the first lumen by the seal.

DESCRIPTION OF THE DRAWINGS

FIG. 6 is a perspective view of an assembly in accordance with an exemplary embodiment of the present invention.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
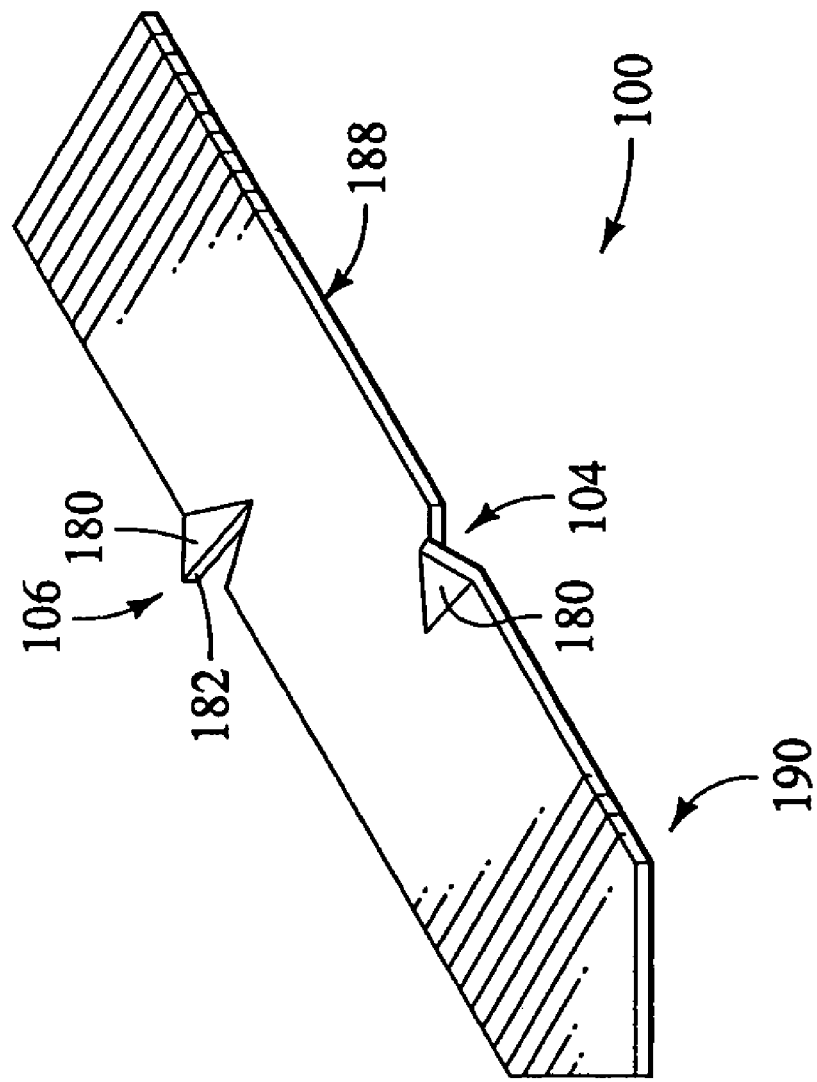
FIG. 1 is a perspective view of a keeper in accordance with an exemplary embodiment of the present invention.

FIG. 1 is a perspective view of a keeper 100 in accordance with an exemplary embodiment of the present invention. Keeper 100 comprises a body 188 having a tip portion 190. Keeper 100 also includes a first lock 104 and a second lock 106. In the embodiment of FIG. 1, each lock includes a ramping surface 180 and a locking surface 182.

Figure 2:
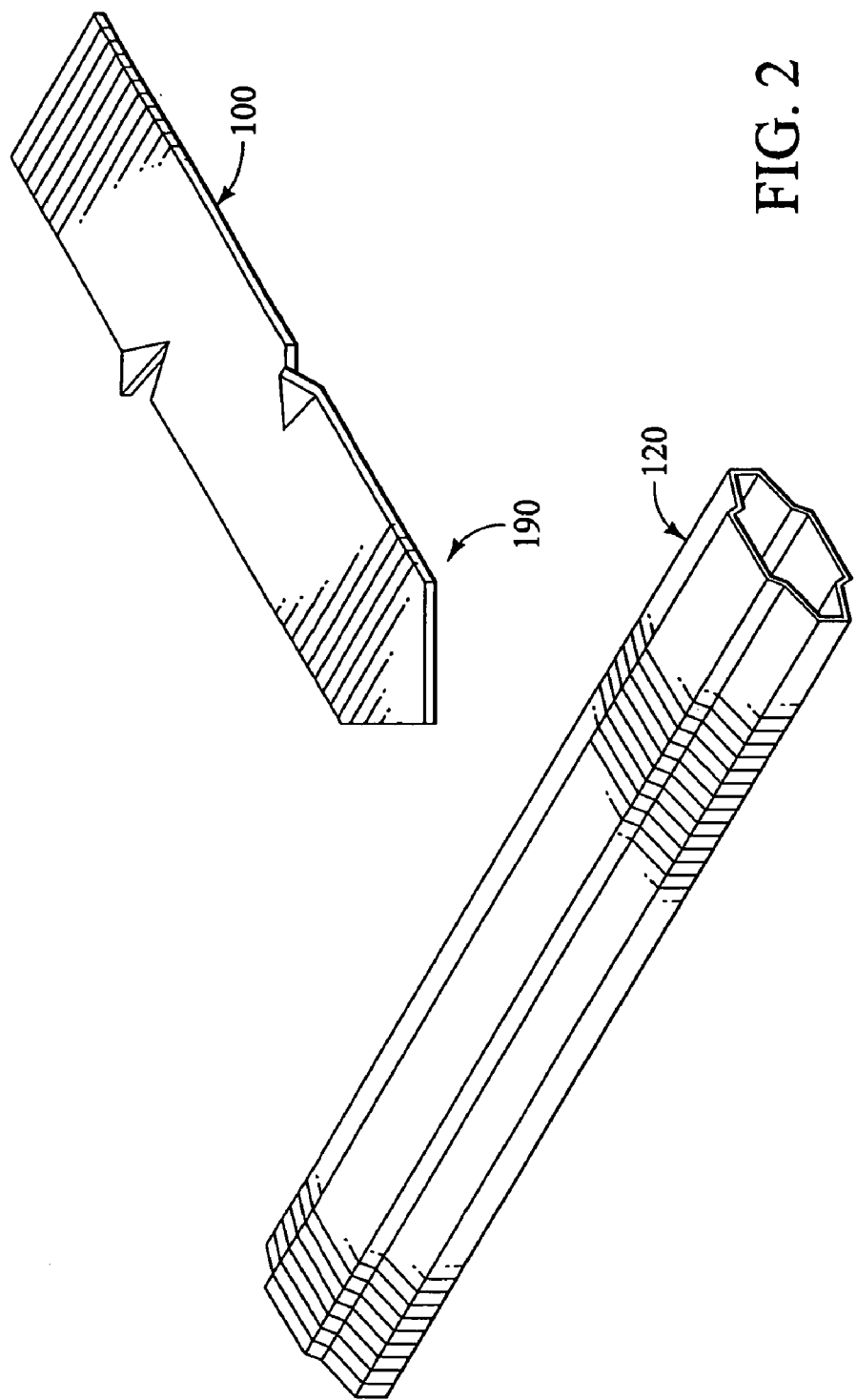
FIG. 2 is a perspective view of an assembly in accordance with an exemplary embodiment of the present invention.

FIG. 2 is a perspective view of an assembly in accordance with- an exemplary embodiment of the present invention. The assembly of FIG. 2 includes a first muntin bar segment 120 and keeper 100. In FIG. 2 it may be appreciated that tip portion 190 of keeper 100 is generally aligned with first muntin bar segment 120. In some methods in accordance with the present invention, first muntin bar segment 120 may be held in position relative to keeper 100 using an assembly fixture. In some methods in accordance with the present invention, keeper 100 may be held in place relative to first muntin bar segment 120 using a holder. In some methods in accordance with the present invention, the assembly fixture and the holder may be used to urge muntin bar segment 124 and keeper 100 towards one another.

Figure 3:
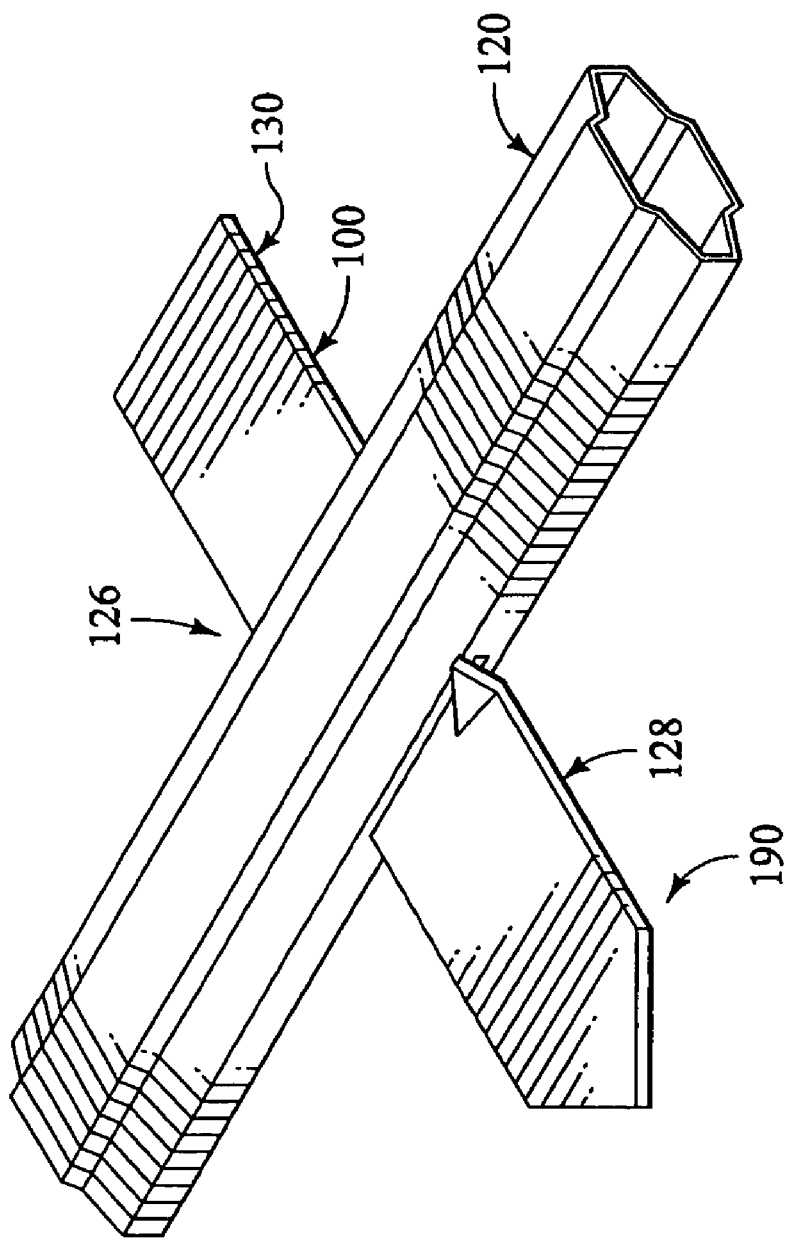
FIG. 3 is a perspective view of an additional assembly in accordance with an exemplary embodiment of the present invention.

FIG. 3 is a perspective view of an additional assembly in accordance with an exemplary embodiment of the present invention. The assembly of FIG. 3 includes first muntin bar segment 120 and keeper 100. In the embodiment of FIG. 3, keeper 100 is disposed so that it extends through a body portion 126 of first muntin bar segment 120. A first portion 128 of keeper 100 extends beyond one side of first muntin bar segment 120 and a second portion 130 of keeper 100 extends beyond another side of first muntin bar segment 120.

In some methods in accordance with the present invention, tip portion 190 of keeper 100 may be used to pierce a muntin bar segment. Thus, tip portion 190 of keeper 100 is preferably shaped and dimensioned so that keeper 100 is capable of piercing the walls of a muntin bar segment.

Figure 4:
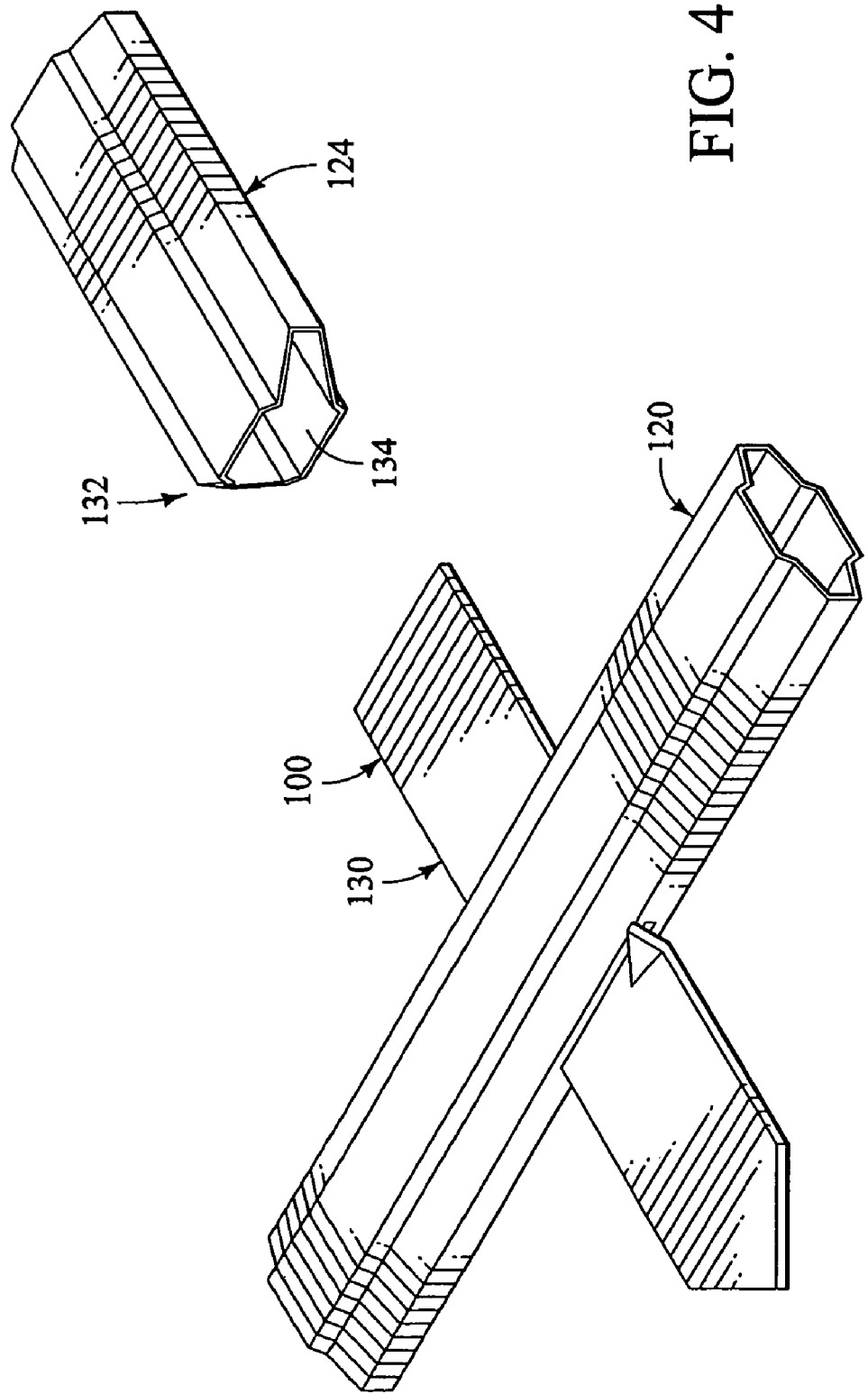
FIG. 4 is a perspective view of an assembly in accordance with an exemplary embodiment of the present invention.

FIG. 4 is a perspective view of an assembly in accordance with an exemplary embodiment of the present invention. The assembly of FIG. 4 includes a first muntin bar segment 120, a second muntin bar segment 124, and a keeper 100. In the embodiment of FIG. 4, a proximal end 132 of second muntin bar segment 124 has been positioned proximate second portion 130 of keeper 100. In a preferred method in accordance with an exemplary embodiment of the present invention, second portion 130 of keeper 100 is shaped and dimensioned to be received by a cavity 134 defined by a wall of second muntin bar segment 124.

Figure 5:
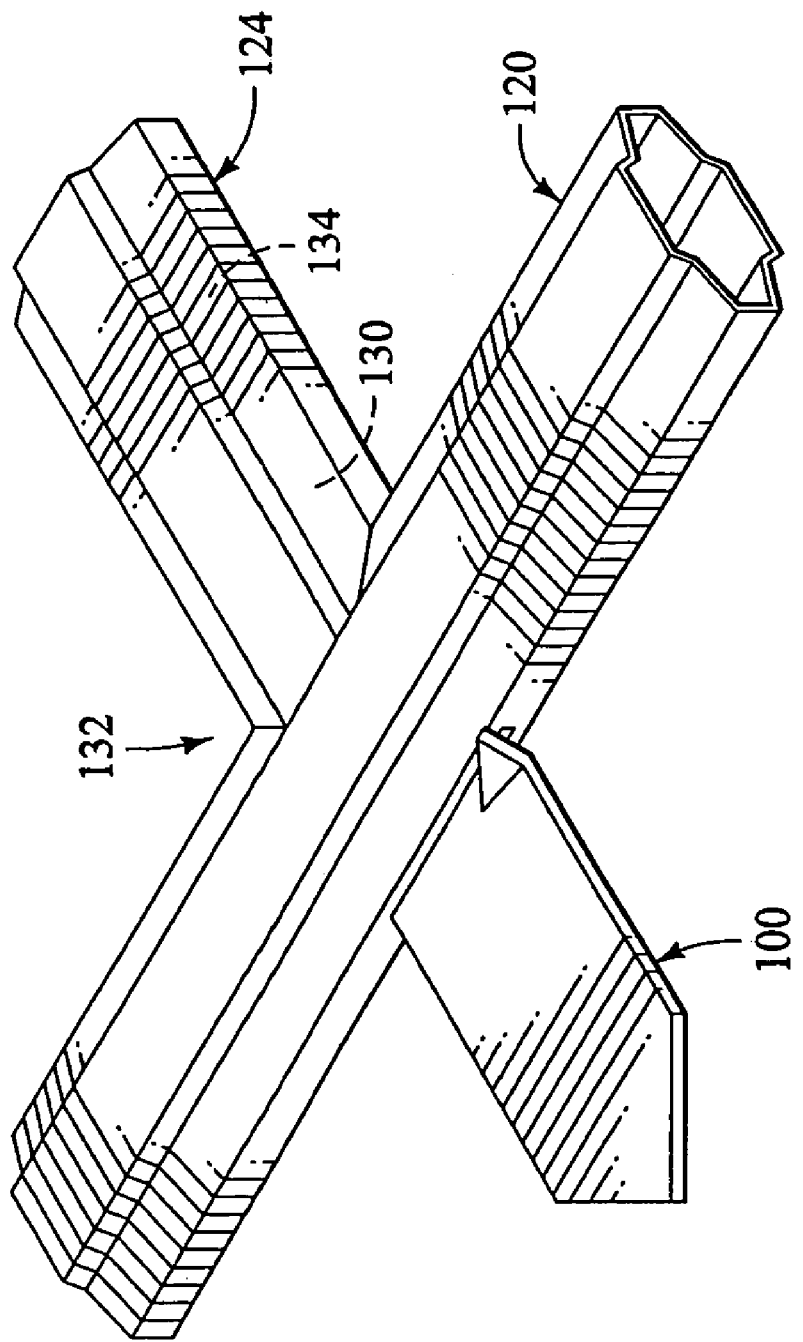
FIG. 5 is a perspective view of an assembly in accordance with an exemplary embodiment of the present invention.

FIG. 5 is a perspective view of an assembly in accordance with an exemplary embodiment of the present invention. In the embodiment of FIG. 5 second portion 130 of keeper 100 has been received within a cavity 134 of second muntin bar segment 124. In the embodiment of FIG. 5, it may be appreciated that proximal end 132 of second muntin bar segment 124 has a shape which generally matches a profile of first muntin bar segment 120.

FIG. 6 is a perspective view of an assembly in accordance with an exemplary embodiment of the present invention. In the embodiment of FIG. 6, a third muntin bar segment 122 has been positioned proximate first portion 128 of keeper 100. First portion 128 of keeper 100 is preferably shaped and dimensioned to be received within a cavity 135 of third muntin bar segment 122.

Figure 7:
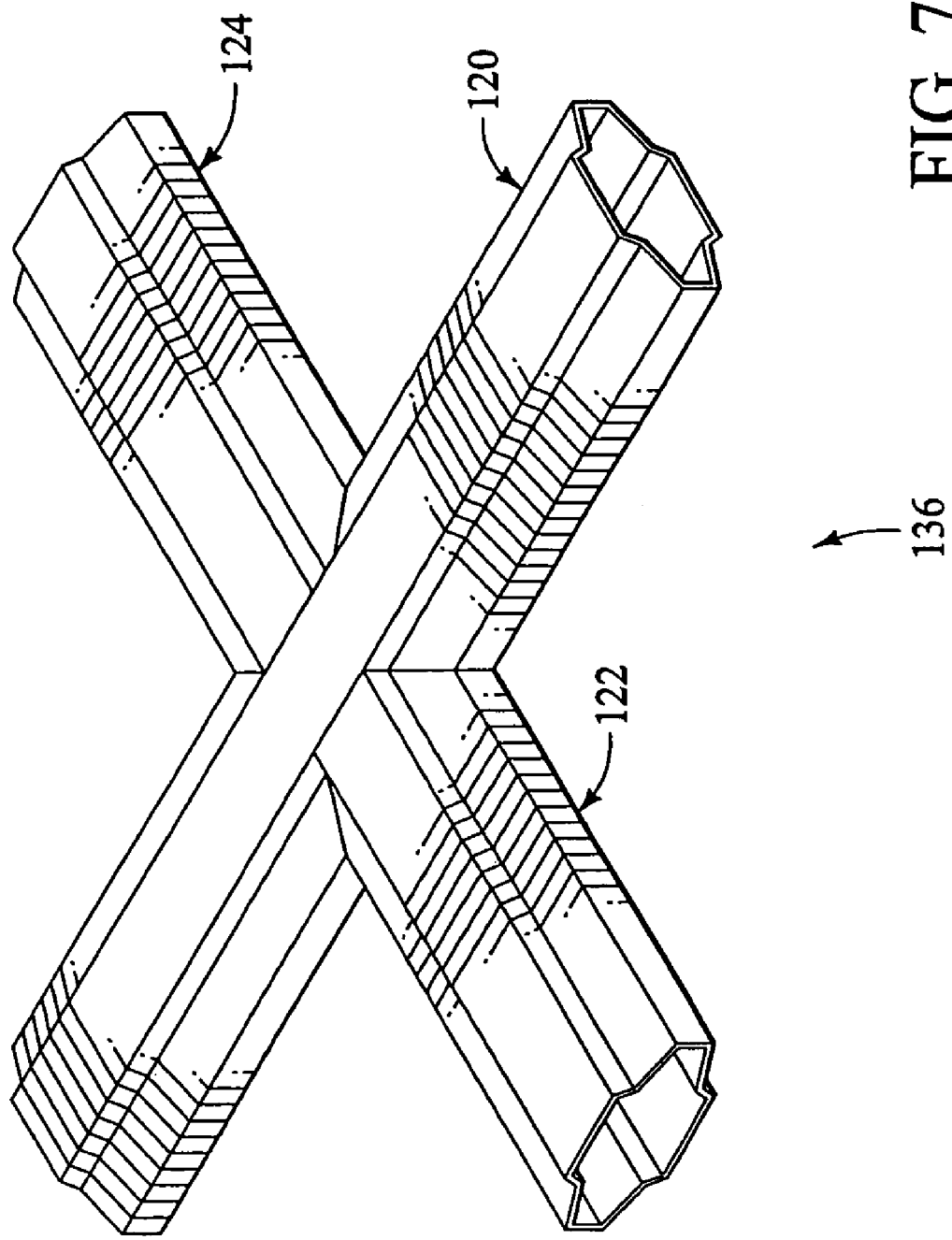
FIG. 7 is a perspective of an assembly in accordance with an exemplary embodiment of the present invention.

FIG. 7 is a perspective view of an assembly in accordance with an exemplary embodiment of the present invention. The assembly of FIG. 7 comprises a lattice 136 including first muntin bar segment 120, second muntin bar segment 124, and third muntin bar segment 122. Although, in the exemplary embodiment of FIG. 7, lattice 136 comprises three muntin bar segments, lattices in accordance with an exemplary embodiment of the present invention may comprise any number of muntin bar segments.

Figure 8:
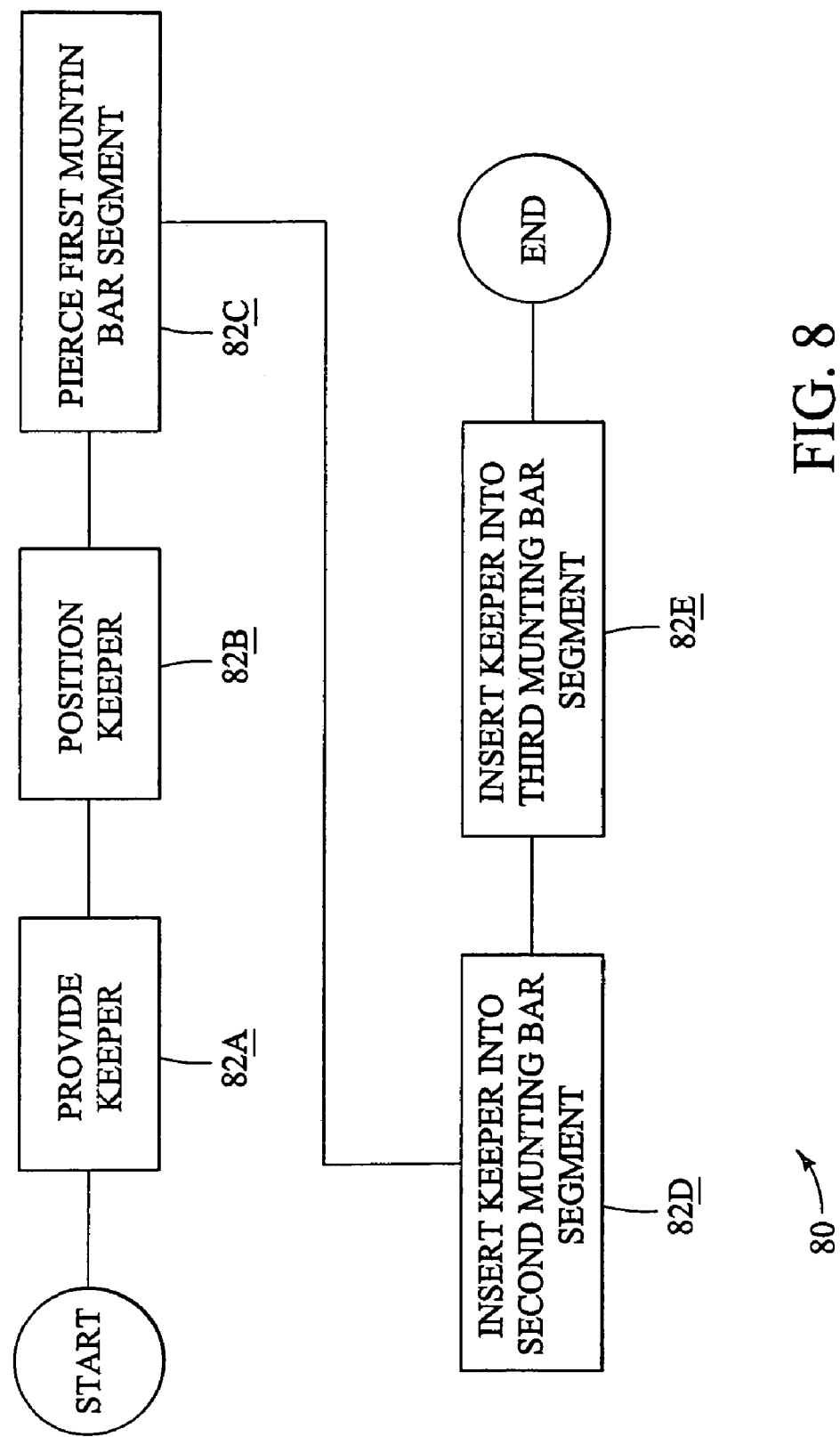
FIG. 8 is a flowchart illustrating one method in accordance with an exemplary embodiment of the present invention.

FIG. 8 is a flowchart 80 illustrating one method in accordance with an exemplary embodiment of the present invention. At block 82A, a keeper. At block 82B the keeper is positioned in a holder.

Block 82C includes the step of piercing first muntin bar segment. In some methods in accordance with the present invention, the first muntin bar segment may be held by an assembly fixture. A holder may be used to position the keeper proximate and in alignment with the first muntin bar segment. The assembly fixture and the holder may then be used to move the keeper and the first muntin bar segment relative to one another so that the point of the keeper pierces the first muntin bar segment.

Block 82D of flowchart 80 includes the step of inserting a first portion of the keeper into a second muntin bar segment. Block 82E of flowchart 80 includes the step of inserting a second portion of the keeper into a third muntin bar segment.

Figure 9:
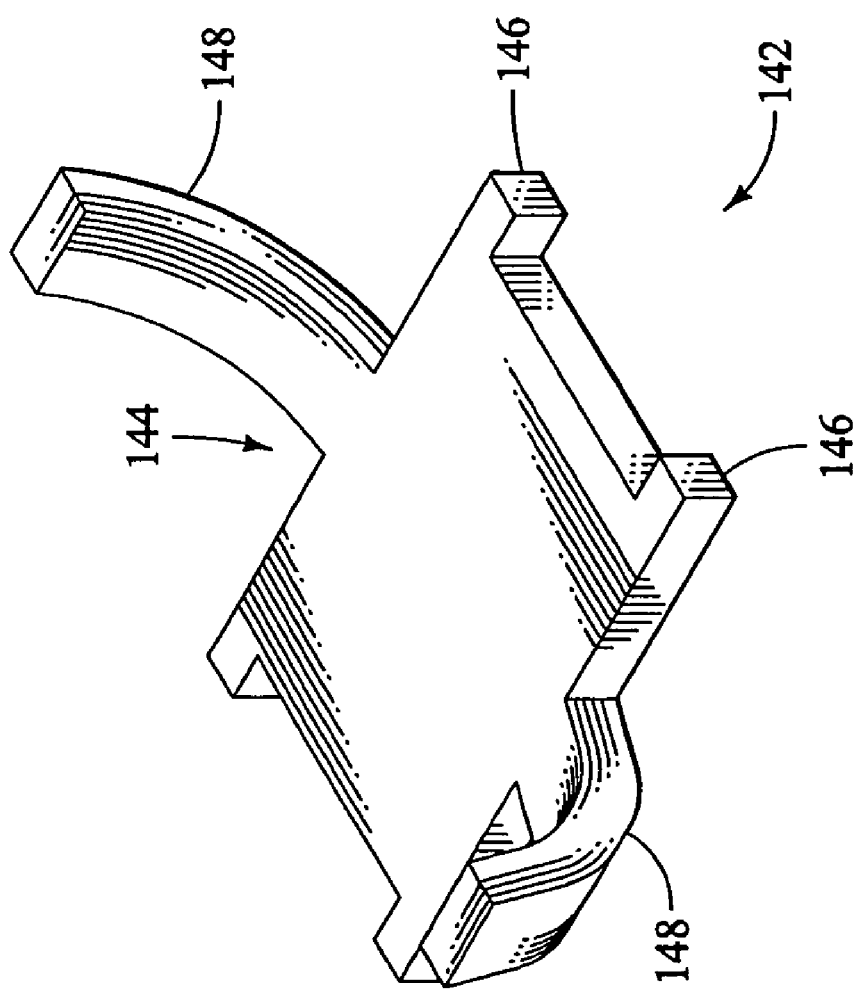
FIG. 9 is a perspective view of a clip in accordance with an exemplary embodiment of the present invention.

FIG. 9 is a perspective view of a clip 142 in accordance with an exemplary embodiment of the present invention. In the embodiment of FIG. 9, clip 142 includes a chassis 144 defining a plurality of prongs 146. Clip 142 also includes a plurality of arms 148. In a preferred embodiment, clip 142 comprises a resilient material (e.g., spring steel).

Figure 10:
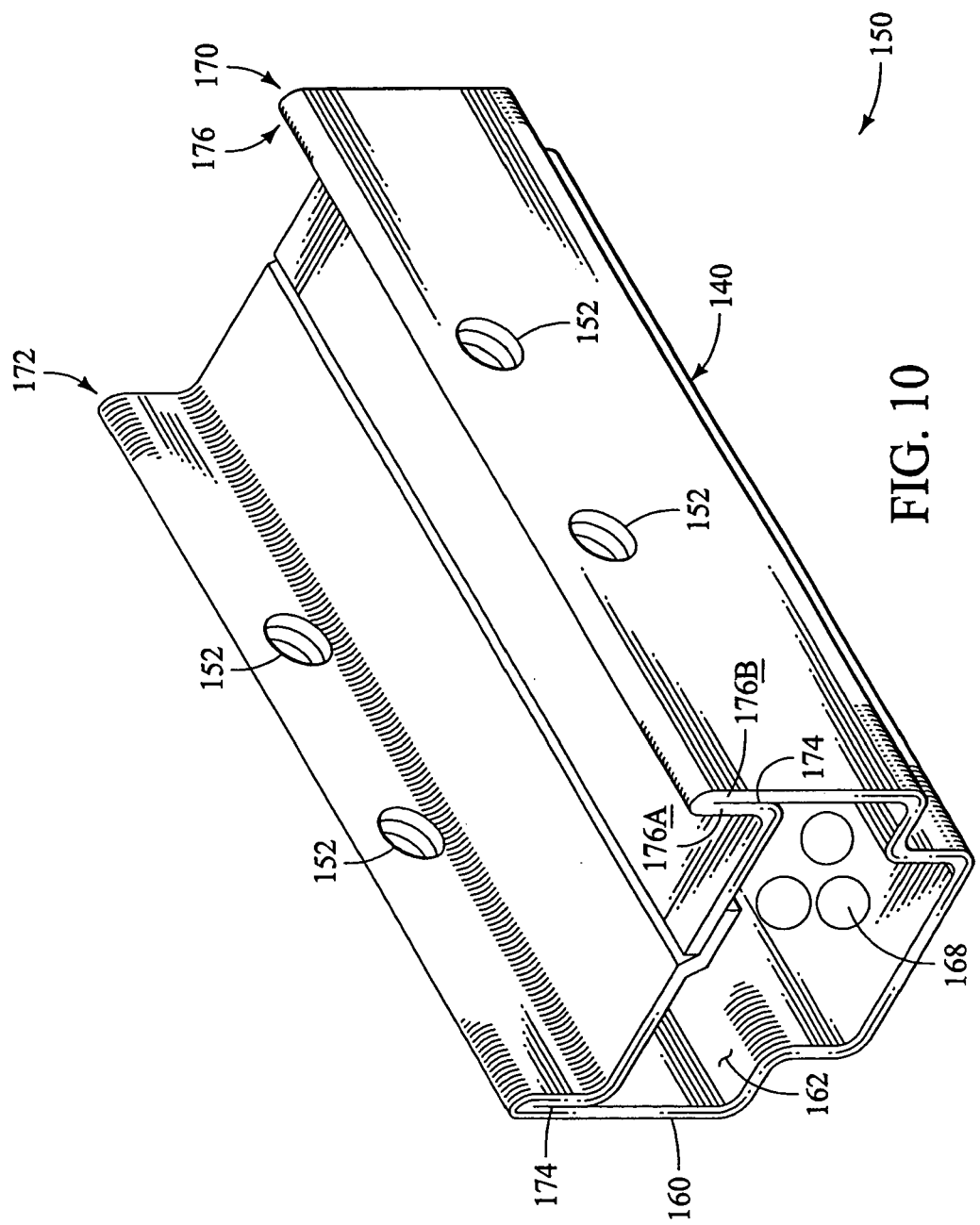
FIG. 10 is a perspective view of a spacer in accordance with an exemplary embodiment of the present invention.

FIG. 10 is a perspective view of a spacer 150 in accordance with an exemplary embodiment of the present invention. In the embodiment of FIG. 10, spacer 150 includes a tubular member 140 comprising a wall 160 defining a lumen 162. In FIG. 10, a plurality of granules 168 are shown disposed within lumen 162. Granules 168 may comprise, for example, a desiccant material (e.g., molecular sieve) and/or a filler material (e.g., clay).

Spacer 150 also includes a mounting flange 170 defining a plurality of mounting holes 152. In the embodiment of FIG. 10, mounting flange 170 comprises a first portion 176 of wall 160 that is doubled back upon itself. A seam 174 is formed between a first leg 176A and a second leg 176B of mounting flange 170. Seam 174 may be formed, for example, by roll forming wall 160 and pressing first leg 176A tightly against second leg 176B. In a preferred embodiment, first leg 176A and second leg 176B are positioned against one another so that no particulate material (e.g., desiccant dust) can escape from lumen 162 through mounting holes 152. In this preferred embodiment, particulate material may be prevented from migrating into the sealed space of an insulating glass unit including spacer 150. In some embodiments, seam 174 is dimensioned such that mounting holes 152 do not communicate with lumen 162.

Spacer 150 also includes a second mounting flange 172 defining a plurality of mounting holes 152. In the embodiment of FIG. 10, mounting flange 170 comprises a second portion of wall 160 that is doubled back upon itself. A second seam 174 is formed between a first leg and a second leg of second mounting flange 172. In a preferred embodiment, mounting holes 152 are located and dimensioned to receive the prongs of a clip in accordance with an exemplary embodiment of the present invention.

Figure 11:
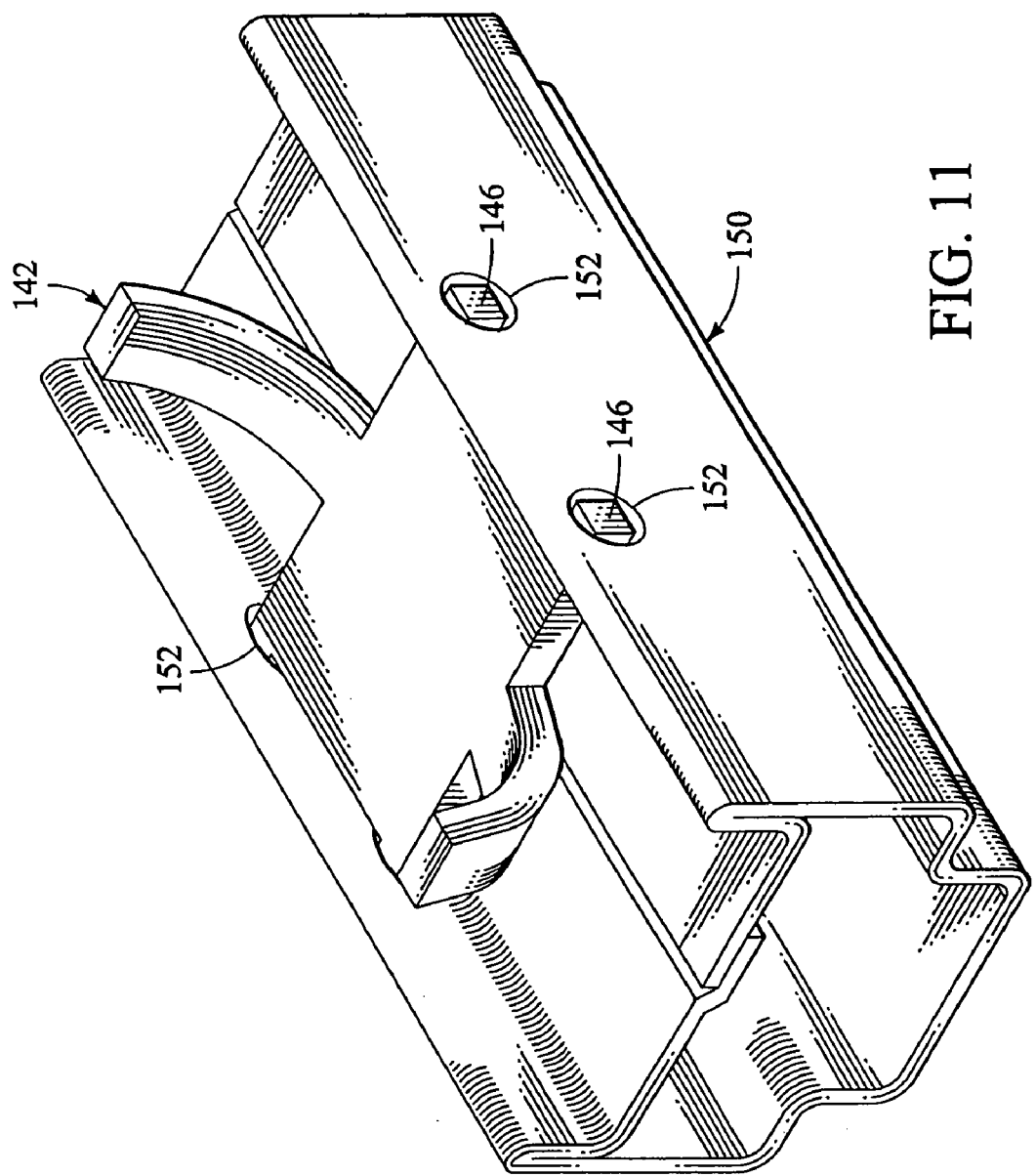
FIG. 11 is a perspective of an assembly in accordance with an exemplary embodiment of the present invention.

FIG. 11 is a perspective view of an assembly in accordance with an exemplary embodiment of the present invention. The assembly of FIG. 11 includes a spacer 150 and a clip 142. In FIG. 11 it may be appreciated that clip 142 includes a plurality of prongs 146, and that prongs 146 are received within mounting holes 152 defined by spacer 150.

Figure 12:
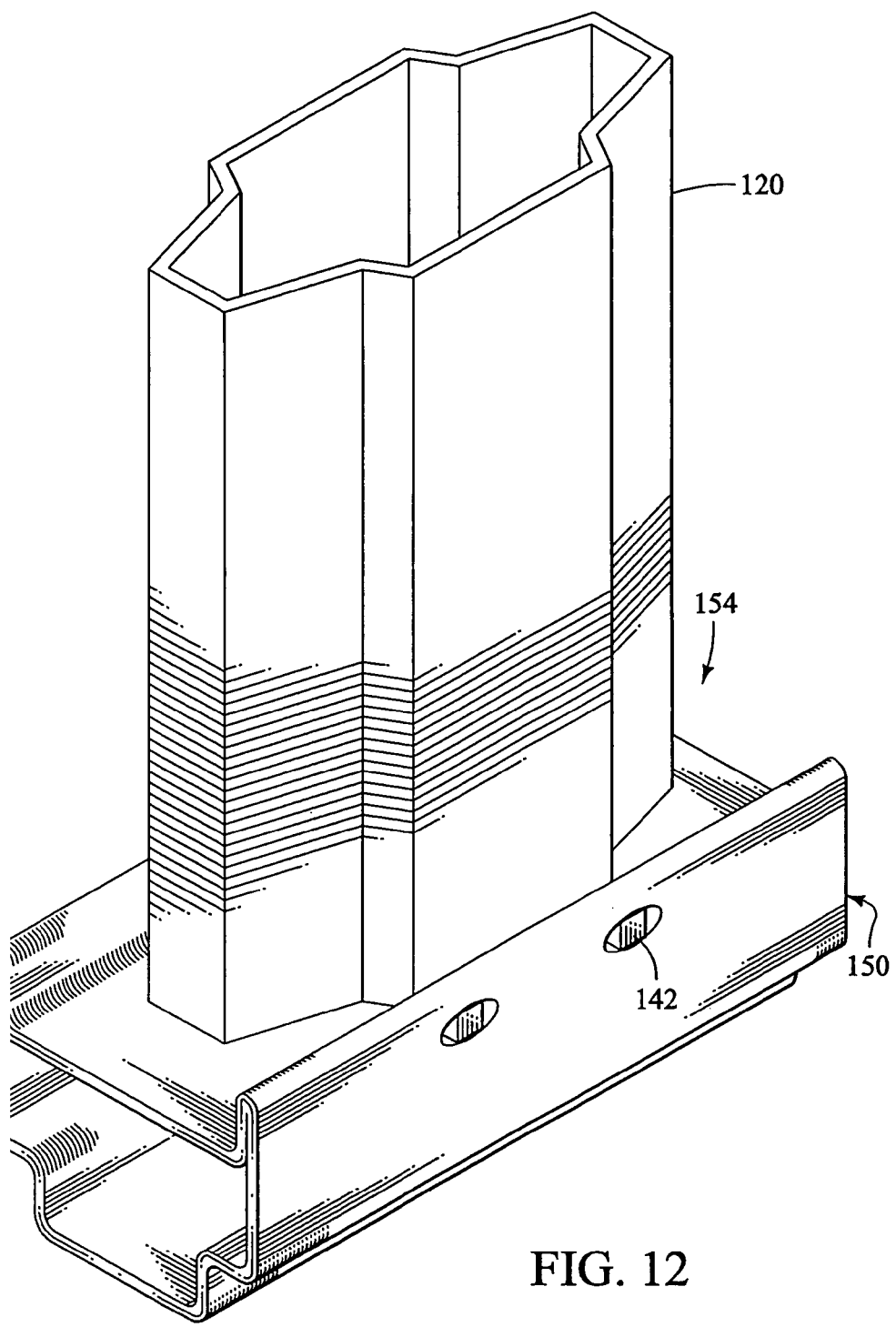
FIG. 12 is a perspective view of an additional assembly in accordance with an exemplary embodiment of the present invention.

FIG. 12 is a perspective view of an additional assembly in accordance with an exemplary embodiment of the present invention. In the embodiment of FIG. 12, a distal portion 154 of a first muntin bar segment 120 is disposed over a clip 142. In some methods in accordance with the present invention, clip 142 may be used to locate an end of a muntin bar segment relative to spacer 150.

Figure 13:
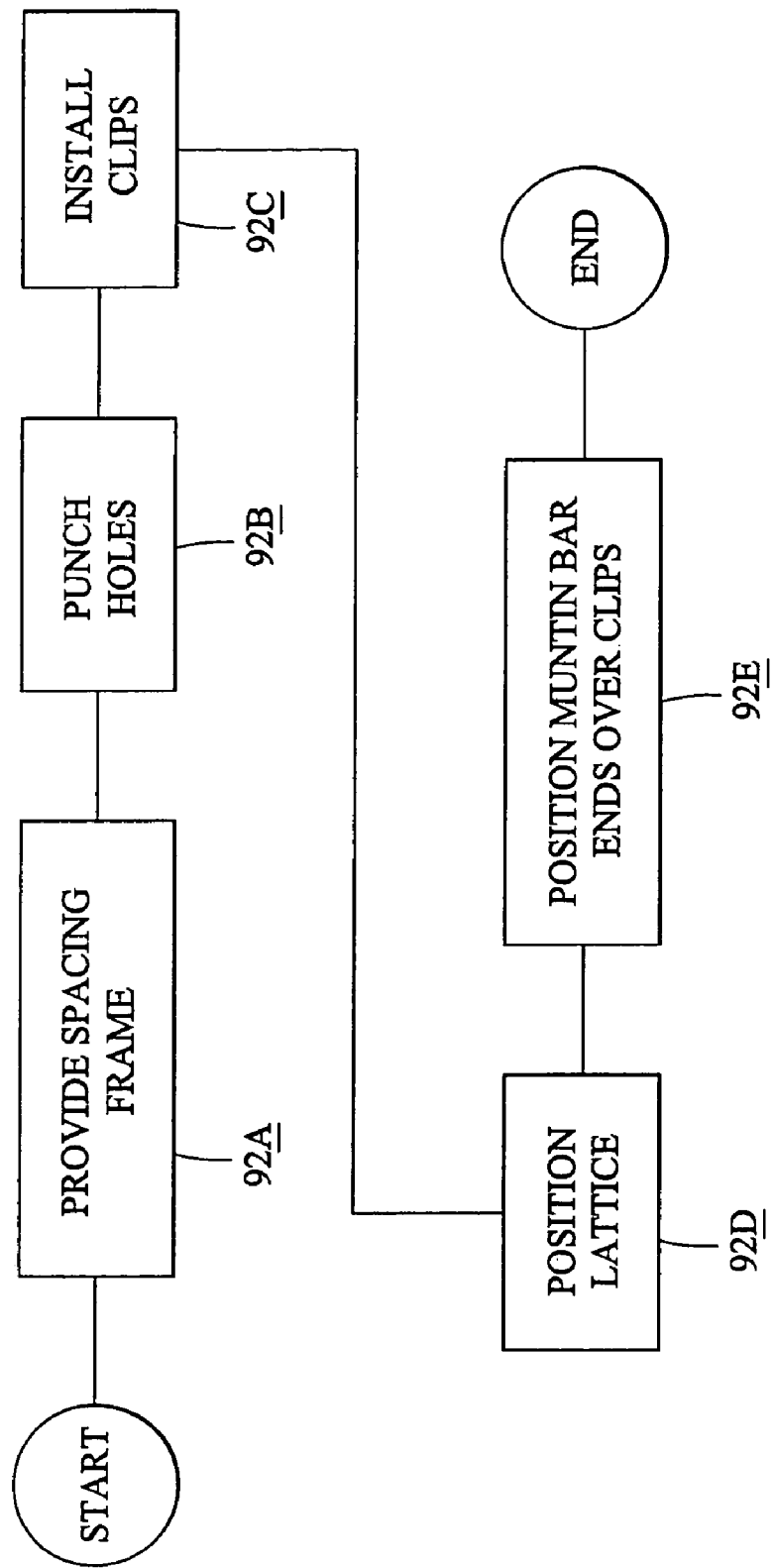
FIG. 13 is a flowchart illustrating an exemplary method in accordance with the present invention.

FIG. 13 is a flowchart 90 illustrating an exemplary method in accordance with an exemplary embodiment of the present invention. Block 92A of flowchart 90 includes the step of providing a spacing frame. The spacing frame may comprise a length of spacer material such as that shown in the previous figures. The length of spacing frame material may be bent into a desired shape and the ends of the spacer material may be fixed to each other.

Block 92B of flowchart 90 comprises the step of punching holes. Methods in accordance with an exemplary embodiment of the present invention may include the step of punching a plurality of holes in a spacer material of a spacing frame. The holes may be located proximate an area where it is anticipated that a muntin bar segment end will be coupled to the spacing frame. At each of these locations, one or more holes may be positioned and dimensioned to except the prongs of a clip in accordance with an exemplary embodiment of the present invention.

Block 92C of flowchart 90 comprises the step of installing clips. In some methods in accordance with the present invention, the step of installing clips may include the step of inserting one or more prongs of a clip into corresponding holes in the spacing frame. The step of installing clips may also include the step of deflecting the clip and allowing one or more prongs to snap into one or more corresponding holes in the spacing frame.

Block 92D of flowchart 90 comprises the step of positioning a lattice. The step of positioning a lattice may comprise the steps of providing a lattice including one or more muntin bar segments, and positioning the lattice so that the ends of one or more muntin bars are disposed over the clips installed in the spacing frame. The step of positioned the lattice may also include the step of placing the lattice within the spacing frame. Block 92E of flowchart 90 includes the step of positioning muntin bar ends over the clips.

Figure 14:
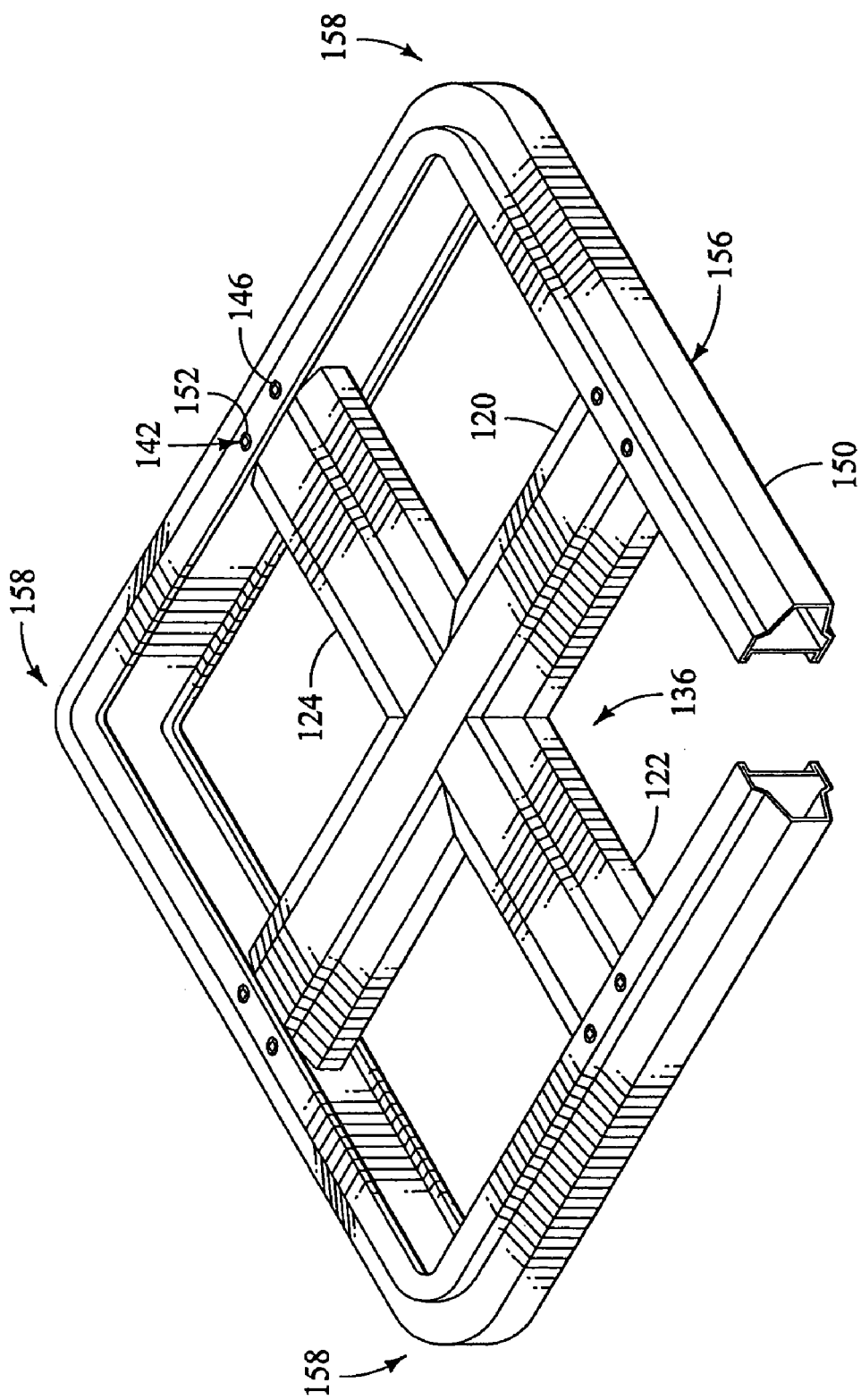
FIG. 14 is a perspective view of an assembly in accordance with an exemplary embodiment of the present invention.

FIG. 14 is a perspective view of an assembly in accordance with an exemplary embodiment of the present invention. The assembly of FIG. 14 includes a spacing frame 156 and a lattice 136. Spacing frame 156 comprises a spacer 150 which defines a plurality of mounting holes 152. In the embodiment of FIG. 14, spacing frame 156 includes a plurality of corners 158. In FIG. 14, one corner 158 is cut away for purposes of illustration. It is to be appreciated that spacing frame 156 may have various shapes without deviating from the spirit and scope of the present invention.

In the embodiment of FIG. 14, lattice 136 comprises a first muntin bar segment 120, a second muntin bar segment 124, and a third muntin bar segment 122. In a preferred embodiment, the proximal end of second muntin bar segment 124 is coupled to first muntin bar segment 120 by a keeper in accordance with an exemplary embodiment of the present invention. In the embodiment of FIG. 14, the distal end of second muntin bar segment is coupled to spacing frame 156 by a clip 142. Clip 142 includes a plurality of prongs 146 which extend into mounting holes 152 defined by spacer 150. In the embodiment of FIG. 14, each end of first muntin bar segment 124 is coupled to spacing frame 156 by a clip 142. In a preferred embodiment, the proximal end of third muntin bar segment 122 is coupled to first muntin bar segment 120 by a keeper in accordance with an exemplary embodiment of the present invention. In the embodiment of FIG. 14, the distal end of third muntin bar segment is coupled to spacing frame 156 by a clip 142.

Figure 15:
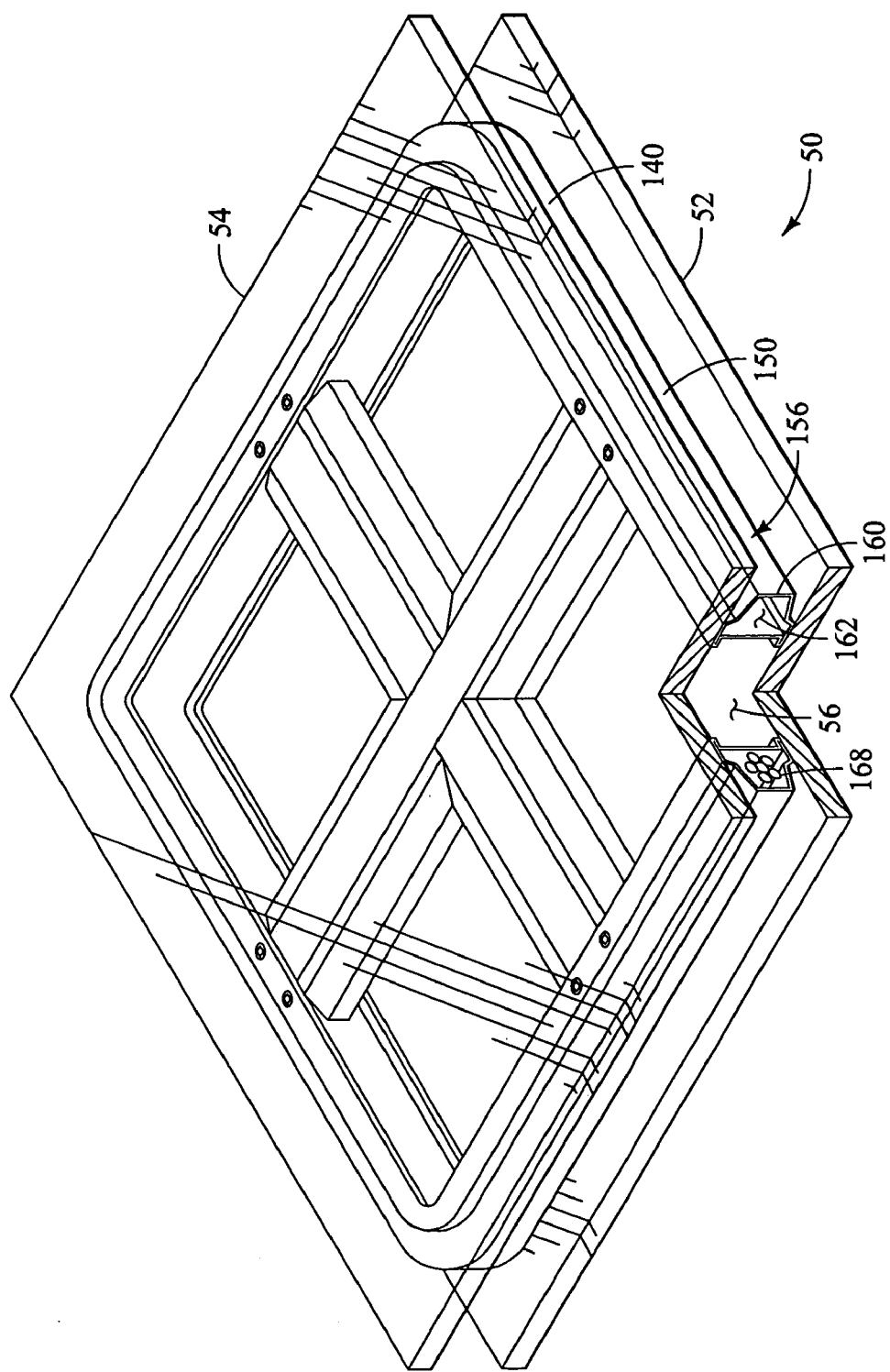
FIG. 15 is a perspective view of an insulating glass unit in accordance with an exemplary embodiment of the present invention.

FIG. 15 is a perspective view of an insulating glass unit 50 in accordance with an exemplary embodiment of the present invention. Insulating glass unit 50 includes a first pane 52, a second pane 54 and a spacing frame 156 that is interposed between first pane 52 and second pane 54. First pane 52 and second pane 54 may be fixed to spacing frame 156, for example, by an adhesive. In FIG. 15, it may be appreciated that first pane 52, second pane 54 and spacing frame 156 define a sealed space 56.

In the embodiment of FIG. 15, spacing frame 156 comprises a spacer 150. Spacer 150 includes a tubular member 140 comprising a wall 160 defining a lumen 162. In FIG. 15, a plurality of granules 168 are shown disposed within lumen 162. Granules 168 may comprise, for example, a desiccant material (e.g., molecular sieve) and/or a filler material (e.g., clay). Embodiments of the present invention are possible in which spacer 150 includes a plurality of apertures which allow lumen 162 to communicated with sealed space 56. In some applications, allowing sealed space 56 to communicated with granules 168 disposed in lumen 162 may prevent water vapor from condensing on first pane 52 and second pane 54. These apertures may be dimensioned to prevent particulate matter (e.g., desiccant dust) from escaping lumen 162 and passing into sealed space 56.

Figure 16:
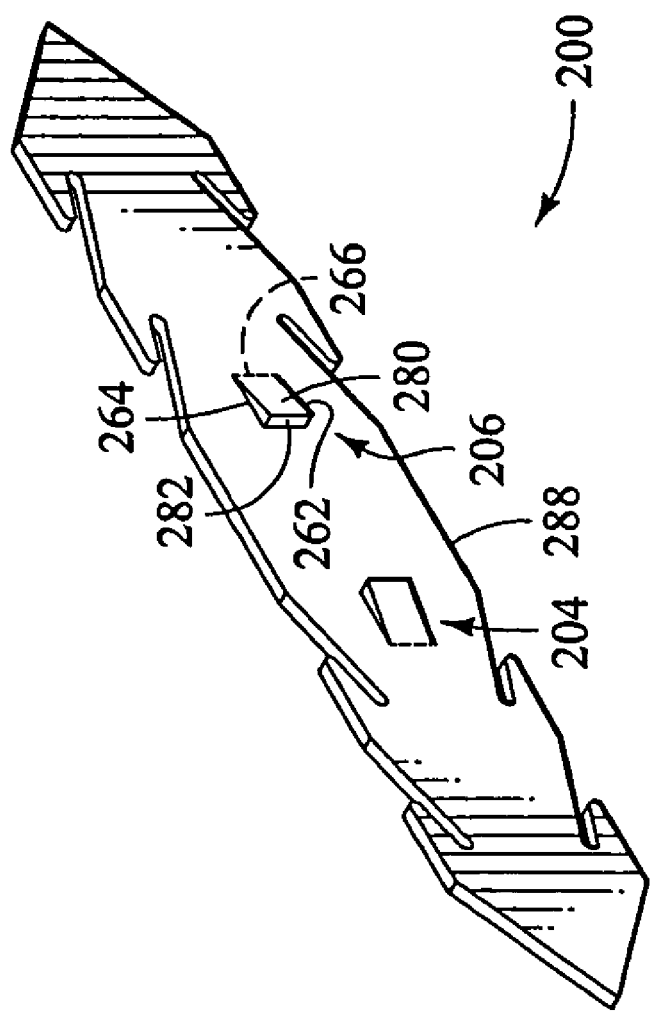
FIG. 16 is a perspective view of a keeper in accordance with an exemplary embodiment of the present invention.

FIG. 16 is a perspective view of a keeper 200 in accordance with an exemplary embodiment of the present invention. Keeper 200 comprises a first lock 204 and a second lock 206. In the embodiment of FIG. 16, each lock comprises a tab 262 defined by a cut 264. Each tab 262 is coupled to a body 288 of keeper 200 by a bend, 266. Each tab 262 includes a ramping surface 280 and a locking surface 282. In a preferred embodiment, locking surface 282 is dimensioned to cooperate with a wall of a muntin bar segment to prevent retrograde motion of keeper 200.

Figure 17:
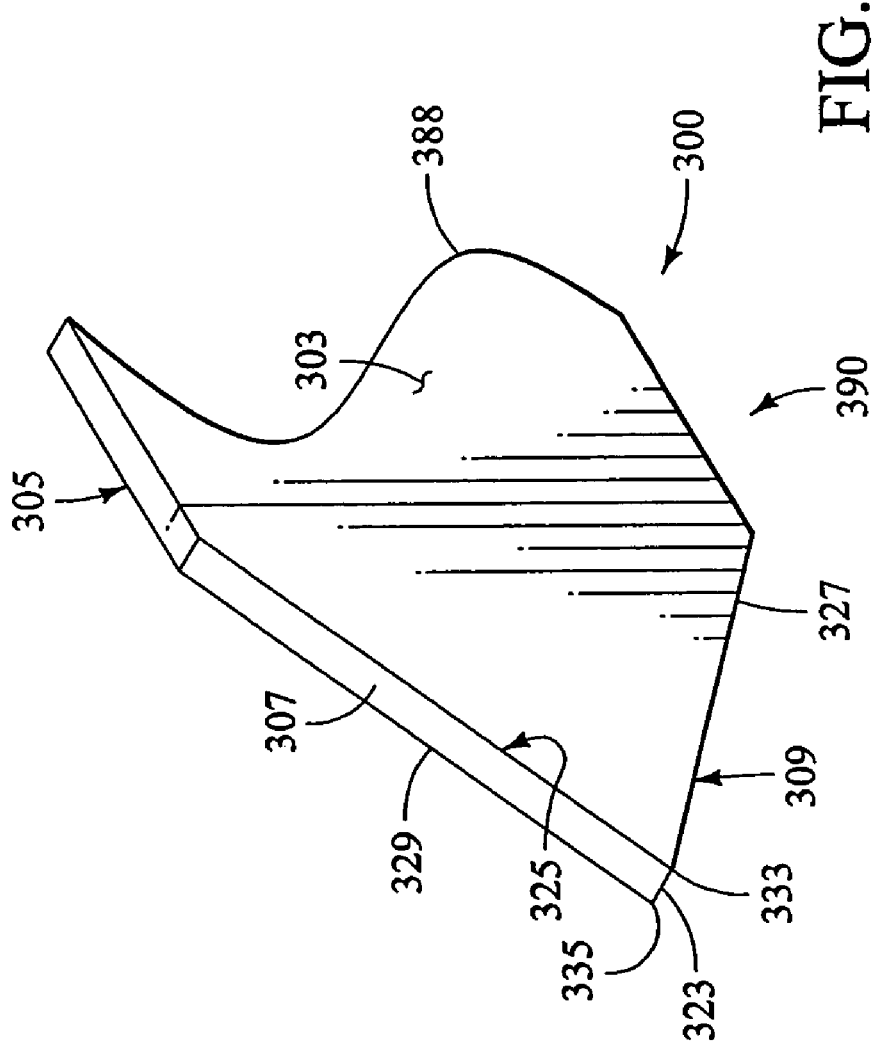
FIG. 17 is a perspective view of a portion of a keeper in accordance with an exemplary embodiment of the present invention.

FIG. 17 is a perspective view of a portion of a keeper 300 in accordance with an exemplary embodiment of the present invention. In the embodiment of FIG. 17, keeper 300 comprises a body 388 having a tip portion 390. In a preferred embodiment, tip portion 390 of keeper 300 is dimensioned for piercing a muntin bar. In the embodiment of FIG. 17, tip portion 390 includes a first major surface 303 and a second major surface 305. A first minor surface 307 is shown extending between first major surface 303 and second major surface 305. Tip portion 390 of keeper 300 also includes a second minor surface 309 extending between first major surface 303 and second major surface 305. In FIG. 17, it may be appreciated that first minor surface 307 and second minor surface 309 intersect to at a first cutting edge 323. In the embodiment of FIG. 17, first cutting edge 323 has a length that is substantially equal to a thickness of body 388.

First minor surface 307 and first major surface 303 intersect to define a second cutting edge 325. Second minor surface 309 and first major surface 303 intersect to define a third cutting edge 327. First minor surface 307 and second major surface 305 intersect to define a fourth cutting edge 329. Second minor surface 309 and second major surface 305 intersect to define a fifth cutting edge (not visible in FIG. 17). First minor surface 307, second minor surface 309, and first major surface 303 intersect to define a first point 333. First minor surface 307, second minor surface 309, and second major surface 305 intersect to define a second point 335.

Figure 18:
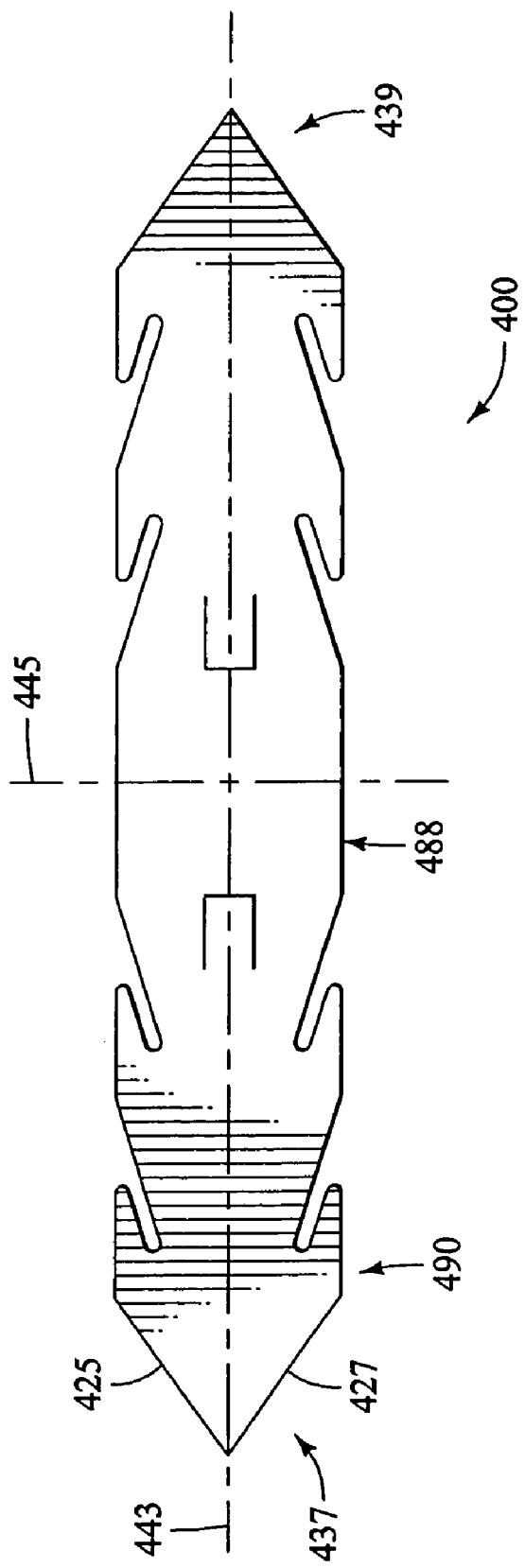
FIG. 18 is a plan view of a keeper in accordance with an exemplary embodiment of the present invention.

FIG. 18 is a plan view of a keeper 400 in accordance with an exemplary embodiment of the present invention. Keeper 400 comprises an elongate body 488 having a proximal end 437 and a distal end 439. In the embodiment of FIG. 18, body 488 includes a tip portion 490 disposed at proximal end 437. Tip portion 490 is preferably dimensioned for piercing a wall of a muntin bar segment to create an opening therein. In a useful embodiment, body 488 has an overall thickness that is less than an overall thickness of a selected muntin bar. In a preferred embodiment, body 488 has an overall thickness that is less than about half the overall thickness of the selected muntin bar.

In FIG. 18, it may be appreciated that keeper 400 includes a longitudinal axis 443 and a lateral axis 445. In the embodiment of FIG. 18, keeper 400 is substantially symmetrical about longitudinal axis 443. Also in the embodiment of FIG. 18, keeper 400 is substantially symmetrical about lateral axis 445. Keeper 400 preferably has an overall width dimensioned to be received in a cavity of a selected muntin bar segment.

In the embodiment of FIG. 18, tip portion 490 of body 488 includes a second cutting edge 425 disposed at a first angle relative to longitudinal axis 443 of body 488. Also in the embodiment of FIG. 18, tip portion 490 of body 488 includes a third cutting edge 427 disposed at a second angle relative to longitudinal axis 443 of body 488. In the embodiment of FIG. 18, the second angle is substantially equal to the first angle.

Figure 19:
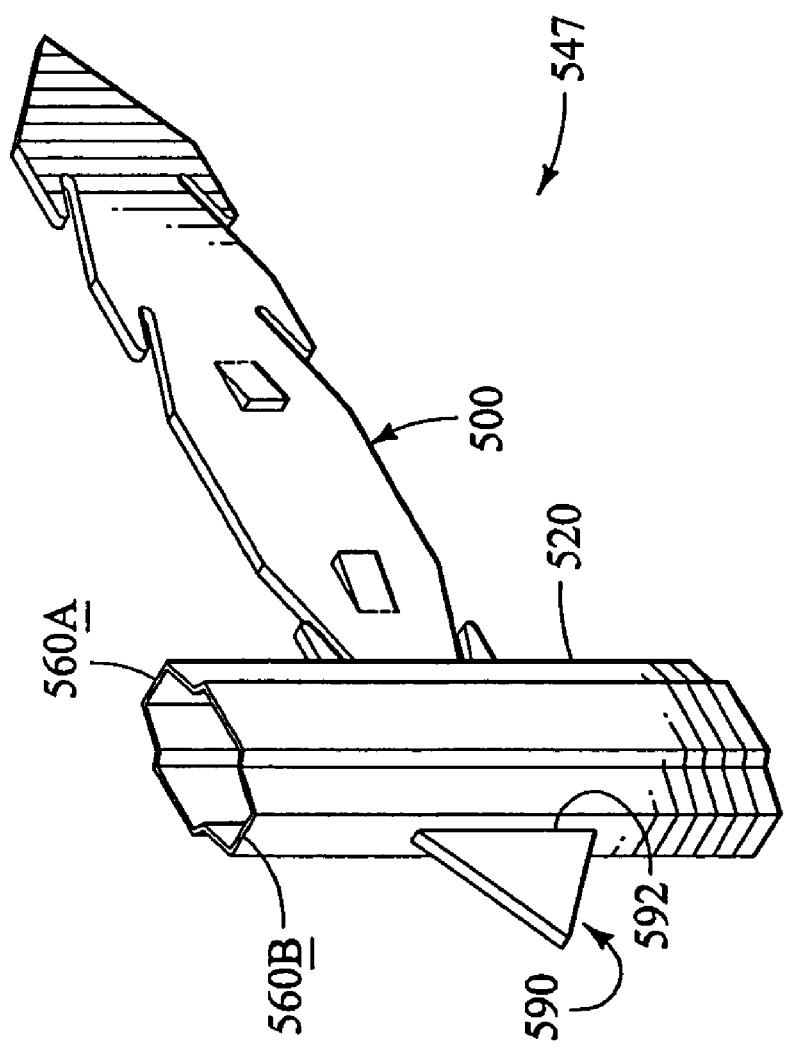
FIG. 19 is a perspective view of an assembly in accordance with an exemplary embodiment of the present invention.

FIG. 19 is a perspective view of an assembly 547 in accordance With an exemplary embodiment of the present invention. Assembly 547 includes a keeper 500 that is shown extending through a first wall 560A and a second wall 560B of a muntin bar segment 520. A tip portion 590 of keeper 500 may be seen extending beyond second wall 560B in FIG. 19. In the embodiment of FIG. 19, keeper 500 extends through an opening 592 defined by second wall 560B of muntin bar segment 520. In some methods in accordance with the present invention, openings are created in a first wall and a second wall by piercing these walls using the tip portion of a keeper.

Figure 20:
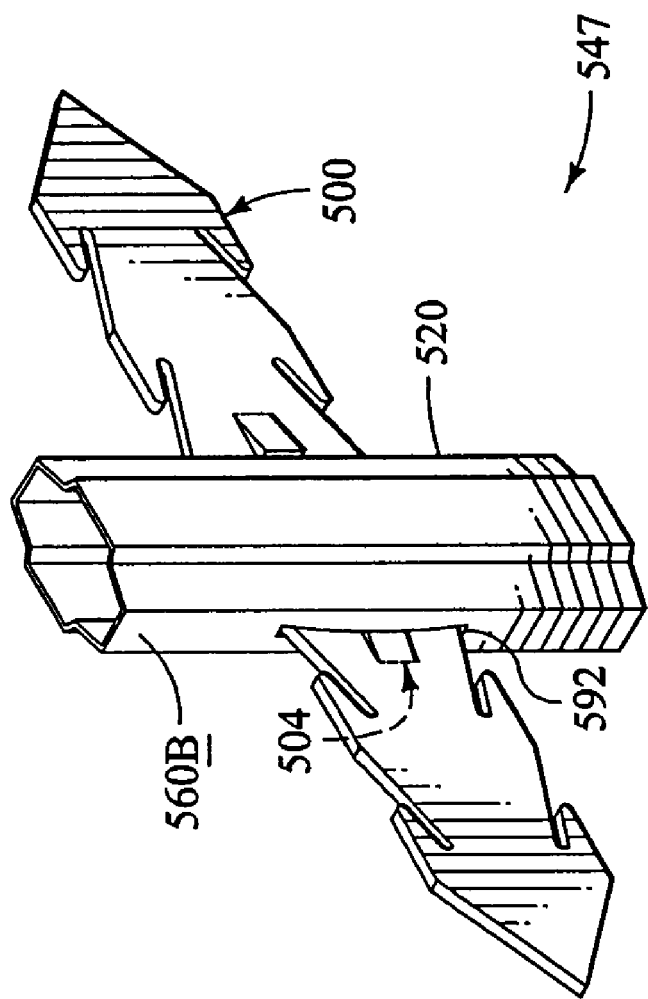
FIG. 20 is an additional perspective view of the assembly of FIG. 19.

FIG. 20 is an additional perspective view of assembly 547 of FIG. 19. In FIG. 20 it may be appreciated that second wall 560B is deformed proximate opening 592. In some embodiments of the present invention, a lock 504 of keeper 500 is dimensioned to deform the walls of a muntin bar segment. In a preferred embodiment, lock 504 of keeper 500 is dimensioned to elastically deform the walls of a muntin bar segment. Elastic deformation may be generally defined as deformation which substantially disappears when the force creating the deformation is removed.

Figure 21:
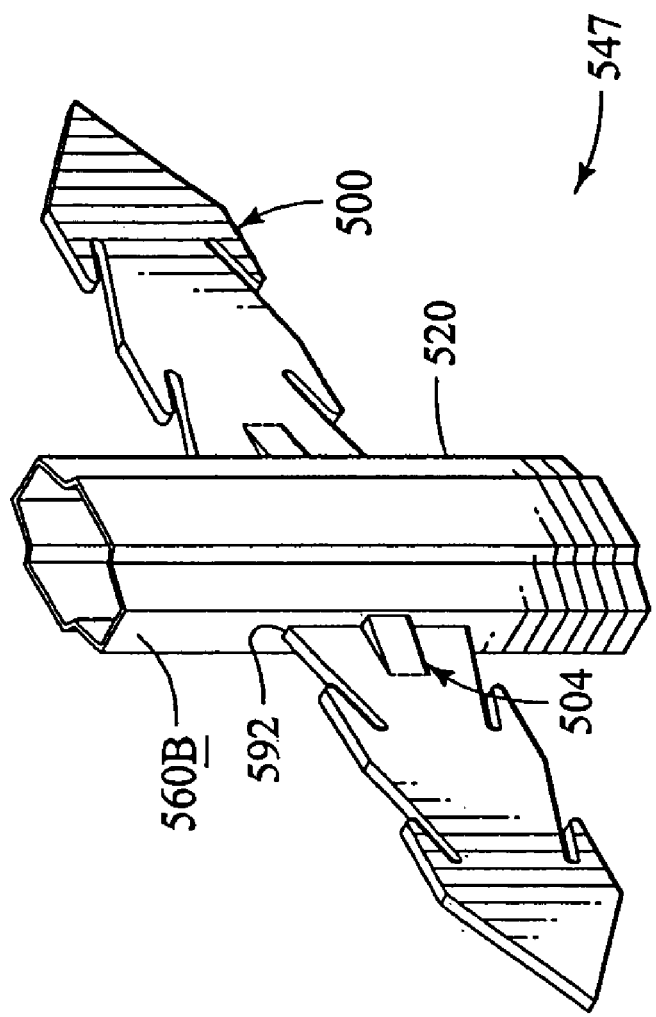
FIG. 21 is an additional perspective view of the assembly of FIG. 19 and FIG. 20.

FIG. 21 is an additional perspective view of assembly 547 of FIG. 19 and FIG. 20. In FIG. 21, it may be appreciated that second wall 560B has assumed a substantially undeformed shape. In a preferred embodiment, lock 504 is dimensioned so that lock 504 and second wall 560B cooperate to prevent retrograde motion of the keeper after lock 504 passes through opening 592.

Figure 22:
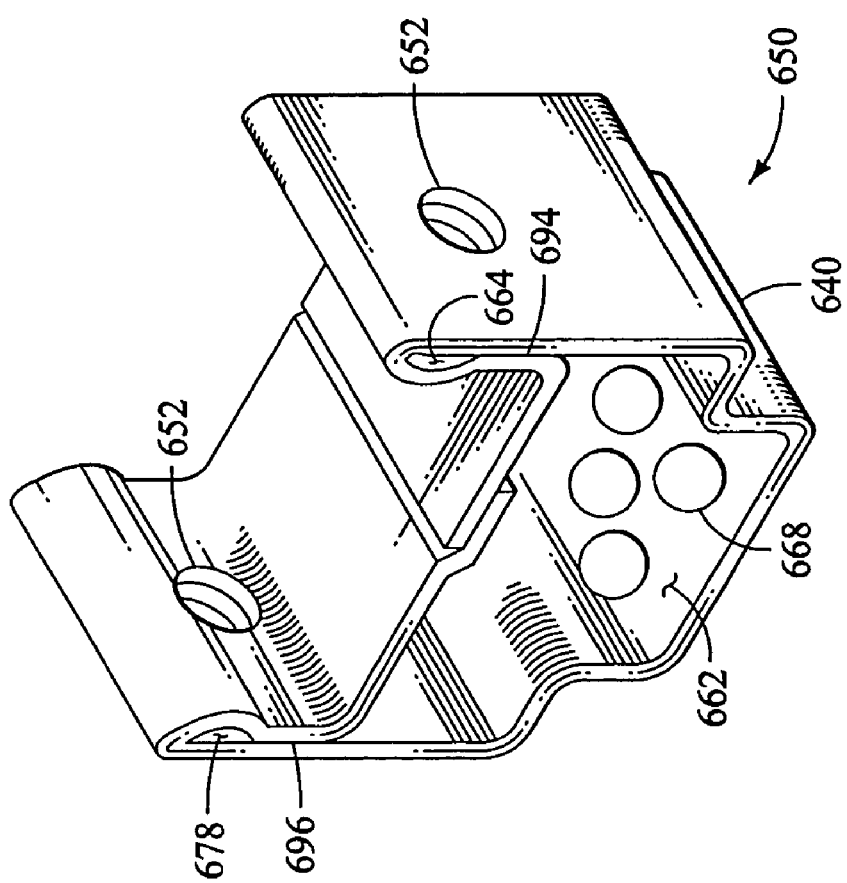
FIG. 22 is a perspective view of a spacer in accordance with an exemplary embodiment of the present invention.

FIG. 22 is a perspective view of a spacer 650 in accordance with an exemplary embodiment of the present invention. In the embodiment of FIG. 22, spacer 650 includes a tubular member 640 defining a first lumen 662, a second lumen 664, and a third lumen 678. In the embodiment of FIG. 22, a plurality of granules 668 are disposed within first lumen 662. Granules 668 may comprise, for example, a desiccant material (e.g., molecular sieve) and/or a filler material (e.g., clay).

In FIG. 22 it may be appreciated that a first seal 694 is interposed between first lumen 662 and second lumen 664. In the embodiment of FIG. 22, tubular member 640 defines a mounting hole 652 that is shown communicating with second lumen 664 and separated from first lumen 662 by first seal 694. A second seal 696 is interposed between third lumen 678 and second lumen 664. In the embodiment of FIG. 22, another mounting hole 652 is shown communicating with third lumen 678 and separated from first lumen 662 by second seal 696.

Various embodiments of first seal 694 and second seal 696 are possible without deviating from the spirit and scope of the present invention. First seal 694 and second seal 696 may comprise, for example, a crimp seal, a weld bead, and/or an adhesive. In one exemplary embodiment, first seal 694 and second seal 696 each comprise an area in which a wall of tubular member 640 is doubled back on itself and positioned so that no particulate material (e.g., desiccant dust) can escape first lumen 662 via mounting holes 652. Embodiments are possible in which first seal 694 and second seal 696 each comprise a liquid tight seal. Embodiments are also possible in which first seal 694 and second seal 696 each comprise a gas tight seal. In a preferred embodiment, mounting holes 652 are located and dimensioned to receive the prongs of a clip in accordance with an exemplary embodiment of the present invention.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A spacer for the separation of panes in an insulating glass unit, comprising:
   a tubular member comprising a wall defining a lumen;
   a mounting flange comprising a first portion of the wall that is doubled back upon itself; and
   a plurality of mounting holes defined by the mounting flange; and
   a seam formed between a first leg of the mounting flange and a second leg of the mounting flange.

2. The spacer of claim 1, further including a second mounting flange comprising a second portion of the wall that is doubled back upon itself.

3. The spacer of claim 1, wherein the mounting holes are dimensioned to receive a plurality of prongs of a clip.

4. The spacer of claim 1, further including a plurality of granules disposed within the lumen.

5. The spacer of claim 4, wherein the granules comprise a desiccant.

6. The spacer of claim 4, wherein the granules comprise clay.

7. The spacer of claim 1, further including a clip having a prong that is disposed in one of the mounting holes.

8. A spacer for the separation of panes in an insulating glass unit, comprising:
   a tubular member comprising a wall defining a first lumen and a second lumen;
   a seal interposed between the first lumen and the second lumen, the seal comprising a portion of the wall that is doubled back upon itself; and
   a plurality of mounting holes communicating with the second lumen and separated from the first lumen by the seal.

9. The spacer of claim 8, wherein the mounting holes are dimensioned to receive a plurality of prongs of a clip.

10. The spacer of claim 8, further including a plurality of granules disposed within the first lumen.

11. The spacer of claim 10, wherein the granules comprise a desiccant.

12. The spacer of claim 10, wherein the granules comprise clay.

13. The spacer of claim 8, further including a clip having a prong that is disposed in one of the mounting holes.

* * * * *